United States Patent Office 3,565,847
Patented Feb. 23, 1971

3,565,847
COMPOSITION OF MATTER COMPRISING A THERMOPLASTIC POLYIMIDE OF 3,4-DICARBOXY-1,2,3,4 - TETRAHYDRO - 1 - NAPHTHALENE SUCCINIC DIANHYDRIDE AND A DIPRIMARY DIAMINE CONTAINING CERTAIN QUANTITIES OF TRIARYL PHOSPHATES
Roland Ralph Dileone, Rowayton, Conn., assignor to American Cyanamid Company, Stamford, Conn., a corporation of Maine
No Drawing. Filed June 5, 1968, Ser. No. 734,579
Int. Cl. C08g 51/40, 51/50
U.S. Cl. 260—30.6    10 Claims

ABSTRACT OF THE DISCLOSURE

A composition of matter comprising the thermoplastic polyimide of 3,4-dicarboxy-1,2,3,4-tetrahydro-1-naphthalene succinic dianhydride and a diprimary diamine containing from about 0.1% to about 15% by weight based on the weight of said polyimide of a phosphate having the formula:

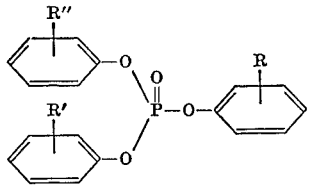

wherein R, R' and R" are hydrogen or an alkyl group containing from 1 to 9 carbon atoms.

CROSS REFERENCES TO RELATED APPLICATIONS

This application is related to the applicant's pending application Ser. No. 575,240, filed Aug. 26, 1966 in that said case shows the preparation of 3,4-dicarboxy-1,2,3,4-tetrahydro-1-naphthalene succinic dianhydride. This application is also related to the instant applicant's copending application Ser. No. 589,521, filed Oct. 26, 1966 in that said application is directed to the polyimides of 3,4-dicarboxy-1,2,3,4-tetrahydro-1-naphthalene succinic dianhydride and a diprimary diamine. This application is also related to the instant applicant's copending application Ser. No. 730,635, filed May 20, 1968. All of the aforementioned copending applications are incorporated herein by reference.

BACKGROUND OF THE INVENTION

Thermoplastic polyimides had been prepared according to the prior art by reacting one or more dianhydrides of tetracarboxylic acids with a diprimary diamine. The polyimides of the prior art have been used for a plurality of purposes depending on their physical properties and some of them can be used to make extrusion moldings and injection moldings. For these latter purposes some of the high molecular weight thermoplastic polyimides are not easily molded by extrusion and injection and require the presence in the polyimide of certain quantities of a plasticizer or a lubricant in order to facilitate the molding. By including a plasticizer and/or lubricant into the composition, fabrication of the molded article is rendered much easier. However, not all plasticizers are suitable for all purposes and a plasticizer which is useful for one category of polyimides may be virtually worthless for other polyimides.

FIELD OF THE INVENTION

This invention is in the field of thermoplastic polyimides prepared by reacting a dianhydride of a tetracarboxylic acid and a diprimary diamine in the presence of certain organic solvents which solvents will not only dissolve the initial reactants but prove to be solvents for the polyimides and their intermediate reaction products leading up to said polyimides so that the intermediate reactants are not precipitated out of solution in the course of the imidization reaction nor is the ultimately, finally completed polyimide insoluble and it too remains in solution. The aryl phosphates which are incorporated into the thermoplastic polyimides of the present invention may be introduced into the solvent medium before, during or after the imidization reaction and will either be dissolved in the reactants; namely, the dianhydride and the diprimary diamine or will be dispersed therein sufficiently so as to become distributed in the ultimate polyimide produced.

DESCRIPTION OF THE PRIOR ART

The instant applicant is not aware of any truly pertinent prior art that is deemed to be anticipatory of the concept of the present invention.

SUMMARY OF THE INVENTION

This invention relates to thermoplastic polyimide compositions derived by reacting a 3,4-dicarboxy-1,2,3,4-tetrahydro-1-naphthalene succinic dianhydride with a diprimary diamine in the presence of a solvent and incorporating into said polyimide certain triaryl phosphates in certain amounts. In my earlier application referred to hereinabove, I have indicated a preference for the use of a solvent selected from the group consisting of acetophenone, cyclohexanone, isophorone, propiophenone and benzophenone. The triaryl phosphates may be introduced into the solvent medium before, during or after the imidization reaction and after the water of imidization has been removed the organic solvent is removed leaving the neat thermoplastic polyimide with the triaryl phosphate dispersed throughout the polyimide. The amount of the triaryl phosphate used may be varied between about 0.1% and 15% by weight based on the weight of the polyimide. Preferably one would use between about 0.5% and 5.0% by weight of the triaryl phosphate, same basis.

Among the triaryl phosphates which may be used in the composition of the present invention are those phosphates having the formula:

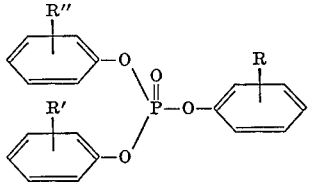

wherein R, R' and R" are hydrogen or an alkyl group containing to 1 to 9 carbon atoms. The R, R' and R" may be the same or a different substituent as defined. More particularly, the phosphates used in the composition of the present invention are triphenyl phosphate, tricresyl phosphate, tris(ethylphenyl) phosphate, tris(propylphenyl) phosphates, tris(butylphenyl) phosphates, tris(amylphenyl) phosphates, tris(hexylphenyl) phosphates, tris(heptylphenyl) phosphates, tris(octylphenyl) phosphates, tris(nonlyphenyl) phosphates, and the like. The alkaryl phosphates may have the alkyl group in the o-, m- or p-position.

After the imidization reaction is completed and the water of imidization has been substantially completely removed the solvent is then removed from the composition so as to leave the polyimide molding compound. In removing the solvent any conventional technique such as vacuum distillation or devolatilization and extrusion may be used. The resultant neat polyimide being a thermoplastic material may be chopped up into granules of any selected size so as to be useful as a molding composition.

In preparing the polyimides of the present invention one may utilize a 3,4-dicarboxy-1,2,3,4-tetrahydro-1-naphthalene succinic dianhydride which is referred to hereinbelow as tetralin dianhydride for simplicity and sometimes as TDA for brevity. These dianhydrides will be referred to as TDA per se when the actual compound 3,4 - dicarboxy-1,2,3,4-tetrahydro-1-naphthalene succinic dianhydride is used and as alkyl substituted TDA when the TDA is substituted in the 6 or 7 position with an alkyl group containing from 1 to 7 carbon atoms. It is preferred that a TDA be used as the sole dianhydride in reaction with the diprimary diamine to produce the most desirable polyimides of the present invention. However, other dianhydrides may be used with the TDA in co-reaction with the diprimary diamine but there should be at least 10 mol percent of the TDA present based on the total mols of dianhydrides used to prepare the polyimides. Among the other non-TDA dianhydrides which may be used in the practice of the process of the present invention are the following:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl)sulfone dianhydride;
3,4,9,10-perylene tetracarboxylic dianhydride;
bis(3,4-dicarboxyphenyl) ether dianhydride;
ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl)methane dianhydride;
bis(3,4-dicarboxyphenyl)methane dianhydride;
bis(3,4-dicarboxyphenyl) sulfone dianhydride;
benzene-1,2,3,4-tetracarboxylic dianhydride;
1,2,3,4-butane tetracarboxylic dianhydride;
thiophene-2,3,4,5-tetracarboxylic dianhydride;

and the like and mixtures thereof.

The second essential component used in the process of the present invention is a diprimary diamine having the structural formula:

$$H_2N-R-NH_2$$

in which R is a divalent organic radical. Among the specific diprimary diamines which may be used in the practice of the process of the present invention are:

meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino naphthalene;
3,3'-dimethyl-4,4'-diamino-biphenyl;
3,3'-dimethoxybenzidine;
2,4-bis(beta-amino-t-butyl)toluene;
bis-(para-beta-amino-t-butyl-phenyl)ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)methane;
hexamethylene diamine;
heptamethylene diamine;
octamethylene diamine;
nonamethylene diamine;
decamethylene diamine;
3-methyl-heptamethylene diamine;
4,4'-dimethylheptamethylene diamine;
2,11-diamino-dodecane;
1,2-bis-(3-amino-propoxy)ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;

and mixtures thereof.

In reacting the TDA with the diprimary diamine whether alone or in admixture with other dianhydrides or other diprimary diamines the total number of mols of the dianhydride should be substantially the same as the total number of mols of the diprimary diamine. In other words, the dianhydrides and the diamines are used on a 1:1 mol basis. Slight departures from this mol ratio can be utilized by using a slight excess such as about 5–10 mol percent of either the dianhydride or the diamine. The amount of solvent used in carrying out the process of the present invention may be between about 30% and 99% by weight of solvent based on the total weight of said solution. Preferably depending on the ultimate use of product, one would use between about 30% and 70%.

In order that the concept of the present invention may be more completely understood, the following examples are set forth in which all parts are parts by weight unless otherwise indicated. These examples are set forth primarily for the purpose of illustration.

EXAMPLE 1

Into a suitable reaction vessel such as a Sigma mixer, there is introduced 1562 parts of 3,4-dicarboxy-1,2,3,4-tetrahydro-1-naphthalene succinic dianhydride, 1410 parts of acetophenone and 1034 parts of 4,4'-diaminodiphenyl methane (a 65% solids solution). This mixture is then agitated and heated until a maximum temperature of 165° C. is reached. Water which is the by-product of imidization starts distilling over at about 120° C. When all of the theoretical water has distilled off, the temperature reaches the maximum of 165° C. The total reaction time is about two hours. There is then added to the polyimide solution 4.0% by weight of triphenyl phosphate based on the weight of polymeric material present. After thorough mixing, the polymer is separated from the solvent by devolatilization and extrusion.

EXAMPLE 2

Example 1 is repeated in all essential details except that there is used about 5% by weight of tricresyl phosphate. The tricresyl phosphate is the ordinary tricresyl phosphate of commerce derived substantially from a mixture of meta (about 20%) and para (about 20%) and para (about 80%) cresols and little if any other cresol.

EXAMPLE 3

Example 1 is repeated in all essential details except there is added 10% of triphenyl phosphate.

EXAMPLE 4

Example 1 is repeated in all essential details except that there is used 10% by weight of tricresyl phosphate. The following table summarizes the effect of the 10% addition of the phosphate (based on the total weight of the polymeric material) on the polymer melt temperature, melt viscosity, (measured in relative units of torque) and heat distortion temperature (HDT). The control polymer contains no added phosphate.

TABLE I

|  | Melt temperature, °C. | Melt viscosity (torque) | HDT °C. |
|---|---|---|---|
| Control polymer | 350 | 5,000 | >260 |
| Example: |  |  |  |
| 3 | 302 | 3,500 | 206 |
| 4 | 297 | 2,000 | 211 |

EXAMPLE 5

Example 1 is repeated in all essential details except there is used 3.1% by weight of tris(nonylphenyl) phosphate based on the weight of the polymer and upon devolatilization and extrusion the resulting thermoplastic polyimide had a heat distortion temperature of 242° C. as opposed to the control HDT of greater than 260° C.

I claim:

1. A composition of matter comprising the thermoplastic polyimide of 3,4-dicarboxy-1,2,3,4-tetrahydro-1-naphthalene succinic dianhydride and a diprimary diamine containing from about 0.1% to about 15% by weight based on the weight of said polyimide of a phosphate having the formula:

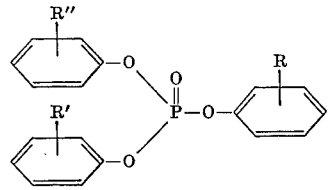

wherein R, R' and R" are hydrogen or an alkyl group containing from 1 to 9 carbon atoms.

2. The composition according to claim 1 in which said phosphate is present in an amount between 0.5% and 5% by weight.

3. A composition according to claim 1 in which the phosphate is triphenyl phosphate.

4. A composition according to claim 2 in which the phosphate is triphenyl phosphate.

5. A composition according to claim 1 in which the phosphate is tricresyl phosphate.

6. A composition according to claim 2 in which the phosphate is tricresyl phosphate.

7. A composition according to claim 1 in which the phosphate is tris(hexylphenyl) phosphate.

8. A composition according to claim 2 in which the phosphate is tris(hexylphenyl) phosphate.

9. A composition according to claim 1 in which the phosphate is tris(nonylphenyl) phosphate.

10. A compositon according to claim 2 in which the phosphate is tris(nonylphenyl) phosphate.

References Cited

UNITED STATES PATENTS 3,440,215  4/1969  Holub _____ 260—47

OTHER REFERENCES

Buttrey, Plasticizers, 1957, pp. 28–39.

MORRIS LIEBMAN, Primary Examiner

R. ZAITLEN, Assistant Examiner

U.S. Cl. X.R.

260—31.2

UNITED STATES PATENT OFFICE
CERTIFICATE OF CORRECTION

Patent No. 3,565,847          Dated February 23, 1971

Inventor(s) ROLAND RALPH DILEONE

It is certified that error appears in the above-identified patent and that said Letters Patent are hereby corrected as shown below:

Column 2, line 55, should be "containing from 1 to 9 carbon atoms" instead of "containing to 1 to 9 carbon atoms".

Column 5, line 6, "and para (about 20%)", following "meta (about 20%)" should be left out.

Signed and sealed this 25th day of May 1971.

(SEAL)
Attest:

EDWARD M. FLETCHER, JR.
Attesting Officer

WILLIAM E. SCHUYLER, JR
Commissioner of Patents